United States Patent [19]

Morita et al.

[11] 4,383,911

[45] May 17, 1983

[54] PROCESS FOR DIRECT LIQUEFACTION OF COAL

[75] Inventors: Minoru Morita; Shimio Sato; Takao Hashimoto, all of Yonezawa; Yoji Kitaoka, Ichihara, all of Japan

[73] Assignee: Yamagata University, Japan

[21] Appl. No.: 261,756

[22] Filed: May 8, 1981

Related U.S. Application Data

[63] Continuation-in-part of Ser. No. 9,828, Feb. 6, 1979, abandoned.

[30] Foreign Application Priority Data

Feb. 8, 1978 [JP] Japan ..................................... 53-12288

[51] Int. Cl.³ ..................................... C10G 1/06

[52] U.S. Cl. ..................................... 208/10

[58] Field of Search ..................................... 208/8 LE, 10

[56] References Cited

U.S. PATENT DOCUMENTS

| | | | |
|---|---|---|---|
| 1,949,109 | 2/1934 | Pier | 208/10 |
| 1,990,708 | 2/1935 | Pier | 208/10 |
| 1,994,075 | 3/1935 | Krauch | 208/10 |
| 2,100,354 | 11/1937 | Pier | 208/10 |
| 2,913,388 | 11/1959 | Howell | 208/10 |
| 3,644,192 | 2/1972 | Li | 208/8 LE |
| 4,211,631 | 7/1980 | Carr | 208/10 |

FOREIGN PATENT DOCUMENTS

| | | | |
|---|---|---|---|
| 54-106506 | 8/1979 | Japan | 208/10 |
| 55-8115 | 3/1980 | Japan | 208/10 |
| 418235 | 5/1938 | United Kingdom | 208/10 |

OTHER PUBLICATIONS

Kastens et al., "Liquid Fuel from Coal", *Industrial and Engineering Chemistry*, May, 1949, pp. 870-885.

Morgan et al., "Hydrogenation of Coal and Coal-Tar Oils under Turbulent Flow Conditions", May, 1938, pp. 152-162.

*Primary Examiner*—Brian E. Hearn

*Attorney, Agent, or Firm*—Robert E. Burns; Emmanuel J. Lobato; Bruce L. Adams

[57] ABSTRACT

A process for directly liquefying coal in a reactor including a preheating section and a reaction section, each having a plurality of pressure-resistant vertical pipes, comprises introducing into the preheating section a paste consisting of finely divided coal, catalyst and heavy oil. In the preheating section the paste is heated to a temperature of 380° to 410° C. and preheated hydrogen is blown into each pipe to create a velocity of Reynolds number equal to at least $3\times10^3$ and an axial dispersion coefficient of not more than 0.05. The preheated paste and hydrogen are forwarded to the reaction section where they are heated to a temperature of 400° to 500° C. and further hydrogen is introduced into each pipe of the reaction section to maintain the velocity and axial dispersion values and a high partial pressure of hydrogen. The total quantity of hydrogen introduced is 1 to 3 times the stoichiometric value.

12 Claims, 3 Drawing Figures

PROCESS FOR DIRECT LIQUEFACTION OF COAL

REFERENCE TO PRIOR APPLICATIONS

This application is a continuatin-in-part of application Ser. No. 9,828 filed Feb. 6, 1979, now abandoned. A divisional application Ser. No. 90,259 filed Nov. 1, 1979 is directed to apparatus for carrying out the process of this invention.

FIELD OF INVENTION

The present invention relates to a process for directly liquefying coal with a high liquid/space ratio (treated paste volume per time/volume of a reactor).

BACKGROUND OF THE INVENTION

It is known as the Bergius process to obtain liquefied crude oil by the hydrocracking of a preheated paste consisting of finely divided coal, catalyst and heavy oil under an elevated temperature and pressure.

For carrying out the Bergius process practically, there have been employed so-called continuous tubular reactors. However, in any such tubular reactors, the residence time of paste within its respective tube is as long as approximately one hour, namely, the liquid/space velocity is about one and a complete mixing is carried out within the reactor by the agitation due to hydrogen injection.

It is obviously advantageous to carry out a reaction with a high liquid/space ratio as more paste can be treated in a reactor of the same volume. To achieve a high liquid/space ratio, in other words, to shorten the residence time, it is necessary to conduct a reaction at an elevated temperature and in a short period of time.

Conventional reactors for direct liquefaction of coal were of the type of complete mixing vessels. It is theoretically known that an ideal tubular reactor can increase the liquid/space ratio of a first order reaction by 4 times and that of a second order reaction by 10 times compared with those in a complete mixing vessel when the reaction velocity constant is identical.

Since the direct liquefaction reaction of coal is a first order reaction, it is theoretically possible to reduce the residence time by one tenth to one twentieth with respect to that in a conventional reactor if the reaction temperature is somewhat raised.

The present inventors have achieved success in directly liquefying coal with a high liquid/space ratio by improving a tubular bubble tower type reactor.

It is known that, in fluid flow within a tube, there are considerable differences in the manner of mixing between fluid flow of a Reynolds number of $3\times10^3$ or greater (turbulent flow range) and that of a smaller Reynolds number of $10^1$–$10^3$ regardless of whether the fluid is a liquid phase or gaseous phase.

In a fluid flow of a Reynolds number of $3\times10^3$ or greater, the flow is a plug flow or quasi plug flow, and mixing in the flow direction is very little but the flow in the radial direction is completely mixed.

In considering the back mixing flow, the extent of back mixing (back mixing degree) is represented by the following equation;

$$\text{back mixing degree} = D/ud$$

wherein u: liquid flow velocity; d: tube diameter; and D: diffusion constant of back mixing. The back mixing degree ranges from $10^1$ to $10^5$ with a Reynolds number of $10^2$ to $0.2\times10^3$ while it ranges from 0.2 to 0.7 with a Reynolds number of $10^4$ to $10^5$.

DESCRIPTION OF INVENTION

Figure 1:
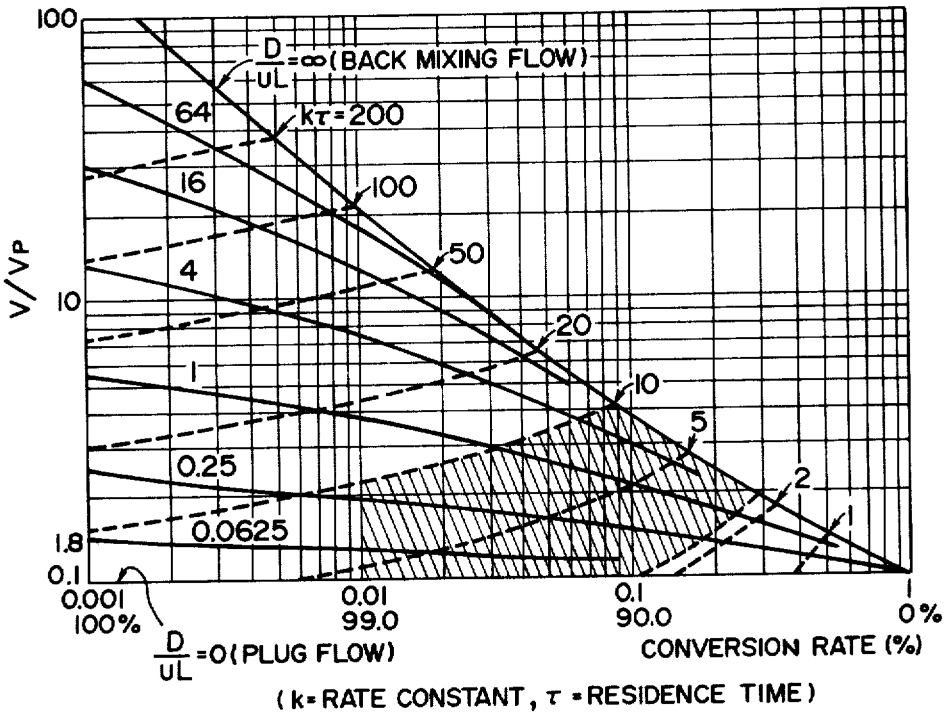
FIG. 1 is a diagram showing the relationship between conversion rate and $V/V_p$ (tank flow/plug flow)

In the present invention, a Reynolds number and the value of D/ud·d/L (wherein, L denotes the whole length of a reaction tube) are set at $3\times10^3$ or greater and not more than 0.05 respectively so as to subject a fluid flow within a tube to a reaction in a turbulent flow region of a plug flow or quasi plug flow and within the hatched area in FIG. 1.

In the conventional direct liquefaction reaction of coal, so-called tubular reactors were occasionally employed, but there are few examples in which the Reynolds number of the fluid flow within a tube was taken into consideration and reactors of a mere tubular or tortuous tubular configuration were used.

In view of the above fact, the present invention provides a process for carrying out a reaction by hydrocracking a paste consisting of finely divided coal, catalyst and heavy oil in a hydrogen gas atmosphere under a pressure of 120 to 700 kg/cm$^2$ and at a temperature of 350° to 500° C., wherein a reactor which comprises a plural number of pressure resistant vertical pipes and which contains a preheating section and a reaction section is employed; said paste is heated in the preheating section to a temperature betwen 380° C. to 410° C. and simultaneously preheated hydrogen gas is charged into the preheating section so as to achieve the combined hydrogen gas and paste velocity of $3\times10^3$ or greater in terms of Reynolds number and also so as to achieve the axial dispersion coefficient (D/uL) of not greater than 0.05; the thus-preheated paste is then forwarded to the reaction section where said preheated paste is heated to a temperature of 400° to 500° C., and into which reaction section preheated hydrogen gas is charged at several locations and a small amount of a dilute paste or heavy oil may be charged if necessary in order to create a fluid flow of the combined hydrogen gas velocity and the flow velocity of the thus-heated paste of $3\times10^3$ or greater in terms of Reynolds number and of an axial dispersion coefficient (D/uL) of not greater than 0.05, thereby carrying out the reaction under conditions indicating a plug flow or quasi plug flow. Thus, the back mixing degree (D/ud) is extremely small.

The total amount of required hydrogen is set at 1 to 3 times the stoichiometrically required hydrogen quantity and the liquefaction reaction is conducted with a liquid/space ratio of 4–20.

As a reactor suitable to maintain the above described flow conditions, the following reactor may be employed;

An apparatus comprising a preheating section formed with a plural units of pipes, each unit including a gas-liquid ascendant pressure resistant (resistant to a pressure up to 500–700 kg/cm$^2$) vertical pipe and a gas-liquid descendant pressure resistant vertical pipe;

A reaction section formed with a plurality of units of pipes, each unit including a gas-liquid ascendant pressure resistant (resistant to a pressure up to 500–700 kg/cm$^2$) vertical pipe, a gas-liquid descendant pressure resistant vertical pipe and a high pressure gas-liquid separator disposed between said ascendant and descendant pipes; a high pressure separator; a condenser for crude oil of a low boiling point; and a condenser for crude oil of a high boiling point, in which the velocity of fluid flow within the reaction section is at least 3×10 in terms of Reynolds number the axial dispersion coefficient (D/uL) is not greater than 0.05 and the diameter ratio of the descendant pipe to its respective ascendant pipe ranges from 0.5 to 0.85.

In a more preferred embodiment, the diameters of the gas-liquid ascendant pipes gradually decrease and the diameter ratio of the ascendant pipe in the $n^{th}$ unit to that in the $n^{th}$ unit is from less than 1 to 0.7.

It is a first feature of the present invention to use a tubular reactor having such a structure as described above.

In the past, no one has proposed a tubular reactor in which the diameter of pipe units gradually decreases or a tubular reactor in which the diameter ratio of an ascendant pipe to its respective descendant pipe is different from each other. It has been found from experimental results that coal can be smoothly directly liquefied with a high liquid/space ratio by means of a tubular reactor of such a structure.

Figure 2:
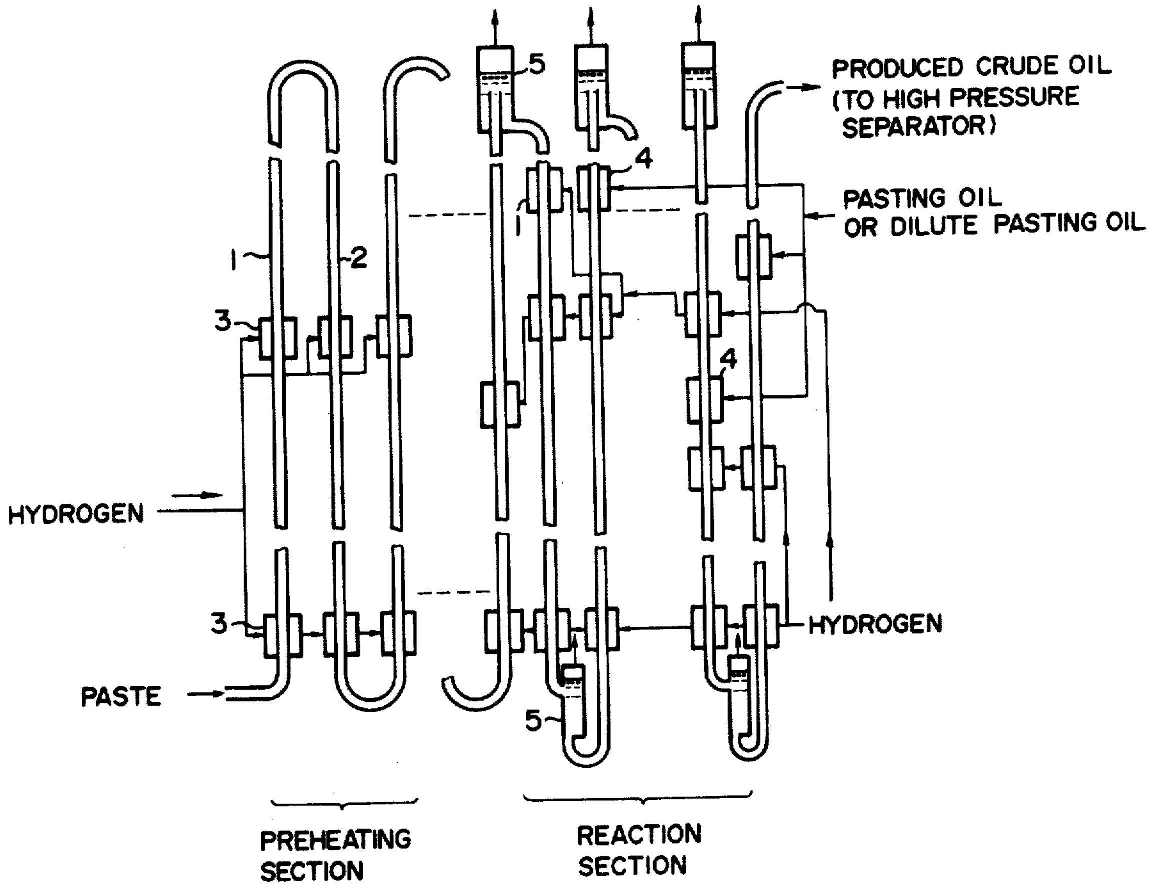
FIG. 2 is a system chart showing an apparatus suited for practicing the process according to the present invention.

In the reactor shown in FIG. 2, the descendant pipe 2 has a different diameter from that of the ascendant pipe 1. The diameter ratio of a vertical descendant pipe to its corresponding vertical ascendant pipe is from 0.5 to 0.85, and preferably from 0.6 to 0.8.

The reason for differentiating pipe diameters as described above is that the void ratio of hydrogen gas bubbles becomes identical in an ascendant pipe and its respective descendant pipe thereby being capable of maintaining the same hydrogen gas bubble conditions in both an ascendant pipe and its respective descendant pipe as the hydrogen gas bubbles rising within an ascendant pipe has an ascending velocity which is the combination of the floating force of the bubbles and the fluid flow velocity whereas the hydrogen bubbles moving down within a descendant pipe travel downwardly with a velocity which is the subtraction of the floating force of the bubbles from the fluid flow velocity. In other words, it is possible to design a reactor with a view to always maintaining a void ratio of 10 to 30% in both ascendant and descendant pipes. This is a second feature of the present invention.

A third feature of this invention resides in the provision of distributed charging and discharging locations of hydrogen. Namely, it is not desired to charge from one location in the reaction section, whole amount of hydrogen required which is about 1–3 times the amount stoichiometrically required, although the hydrogen gas is under high pressure of 120–700 kg/cm$^2$, as it causes an excessively large mass of hydrogen gas and a bubble flow is not formed but a slug or circular flow results. In the method described in Li et. al. U.S. Pat. No. 3,644,192 issued Feb. 22, 1972, hydrogen gas is separately charged at the bottom portion of either one of each vertical ascendant and descendant pipe unit to solve such problems. However, the present invention is characterized in that, in order to maintain a more stable and homogeneous fluid flow, the required amount of hydrogen gas is charged into the reactor through at least two openings, or 10 to 40 openings if necessary, formed through the wall of an ascendant or descendant pipe while any excess hydrogen gas and gas product is discharged by means of a gas-liquid separator provided at the top of each ascendant pipe.

A fourth feature of this invention resides in the charging of paste of low concentration or heavy oil through openings in the pipe walls for the purpose of controlling the reaction temperature. In a direct liquefaction reaction system of coal, the temperature rises rapidly as the reaction proceeds, since 500–600 kcal is exothermically generated per kilogram of coal. In such an exothermic reaction, the reaction temperature control in a conventional method was carried out by charging a great amount of coal and hydrogen gas into the reaction pipes at the latter zone thereof.

In another conventional method, paste or heavy oil is charged into reaction pipes. However, the inventors are not aware of any attempt in which heavy oil or paste of dilute concentration was charged through openings formed in the pipe walls.

In the method of this invention, hydrogen gas, paste of low concentration or heavy oil is charged through openings formed in pipe walls. It has been observed that the thus-charged hydrogen gas, paste of low concentration or heavy oil distributes in a radial direction of the respective pipe immediately after the charging thereof, since the mixing in a radial direction is complete mixing, while there exists only slight back mixing in an axial direction due to the fact that the fluid flow is plug flow.

In the fluid charging method through a pipe wall according to this invention, a portion of a tubular reactor is formed with a double walled pipe. Small apertures are formed through the inner pipe wall in a row along the circumference of the circular pipe, in a zig-zag pattern or in several rows in which apertures are aligned longitudinally and transversely. Hydrogen gas, dilute paste or heavy oil enters the cavity between the inner and outer pipes of the double-walled pipe and then penetrates into the inner pipe through a plurality of apertures formed in the inner pipe.

An example of the aperture arrangement is shown in FIG. 2. According to conventional methods, gas is charged into a reactor from the upper or lower extremity of a vertical pipe through a multi-porous plate made of a ceramic or glass. Such prior art methods did not introduce into a reactor, paste of low concentration or a heavy oil for temperature control. It is particularly undesirable to dispose, within a reactor pipe, a pipe for charging hydrogen gas, paste of low concentration or heavy oil or such a multi-porous plate as described above, since such additional members would disturb the flow within the reactor pipe and also create some flow zones which are not in the form of a plug flow.

Reactor designing has been rendered easy by applying the technique of this invention that hydrogen gas, paste of low concentration or heavy oil is charged into the reactor through the apertures 3, 4 formed in the pipe wall as such apertures can be formed at any locations of the pipe.

The reactor pipes of the present invention are formed by joining in series a great number of vertical double-walled pipes. As shown in FIG. 2, a gas separator 5 is provided with each vertical pipe at the upper and lower extremity thereof for the separation of gas products and excessive hydrogen gas. For example, in case that coal is directly liquefied under 200 atmospheric pressure and at a temperature of 400'–440° C., gas products (for example $CO_2$, $H_2O$, methane and ethane), gasoline and a portion of lighter oil are separated by the above-described separator 5 as the reaction proceeds, and remaining unreacted portions (paste, asphalten, and light, middle heavy and heavy oil) are allowed to travel in a fluid state in the reactor pipes.

As described above and as illustrated in FIG. 2, hydrogen gas in an amount exceeding that required for the liquefaction of the coal is divided into at least two portions and blown into the tubular reactor through a plurality of apertures formed at each of at least two locations of the tubular reactor. Gas-liquid separators are provided alternately with each plurality of the apertures, thus providing with the tubular reactor gas-liquid separators substantially in the same number as the locations of the apertures. In FIG. 2 a gas-liquid separator 5 is shown at the top of each ascendant pipe and at the bottom of each descendant pipe. Gas-liquid separators discharge $CO_2$, $H_2O$, $CH_4$, $C_2H_6$, light oil gas, etc., which have occurred as by-products of the reaction between coal and $H_2$ gas, together with excess $H_2$ gas. Then unreached paste advances through the tubular reactor to the next group of apertures, where it is contacted with $H_2$ gas charged through the same apertures. Therefore, fresh $H_2$ is always blown into the tubular reactor while removing by-product gases out of the reaction system. This makes it possible to maintain the $H_2$ partial pressure in the reaction system at a high level, thereby avoiding resinification of resultant oil. Furthermore, by charging $H_2$ gas at a plurality of locations, the concentration of $H_2$ gas is maintained substantially constant throughout the reaction system and a bubble or plug flow can be maintained in the reaction system. If whole quantity of hydrogen gas were blown in at the inlet of the tubular reactor together with the raw material paste, a ring or mist flow would be caused in the tubular reactor. Such a flow is undesirable to cause the paste to flow through the tubular reactor.

The level of liquid in each gas-liquid separator is maintained constant by detecting the liquid level by means of a float gauge or a radio isotope, and controlling a regulator valve with which the gas outlet of the separator is provided.

In the reaction section of the apparatus according to the invention, the diameters pipes in each pipe unit gradually decrease in size in the flow direction of fluid, because, with pipes of identical diameters, the velocity of the oil phase decreases or becomes zero due to reduced oil portion. The oil phase does not travel effluently within the vertical ascendant pipe 1 and the oil surface is kept at or below the midpoint of each pipe, as the direct liquefaction reaction of coal proceeds. This phenomenon is called "evaporation" which causes the formation of coke and cracked gas which is the main cause for operation suspension. The above-described pipe diameter ratio of the ascendant pipe in an $(n+1)^{th}$ unit to that in an $n^{th}$ unit, namely the pipe ratio of less than 1 to 0.7 was determined experimentally.

A fifth feature of the present invention is to charge a paste of a low concentration or heavy oil, which has been preheated to substantially the same temperature as the reaction fluid, in an amount to compensate the paste (present in the form of asphalten in the reaction) which has been lost due to gasification. The rate of gradual pipe diameter reduction can be determined depending on the reaction type. In the reactor of the present invention, the pipe diameters gradually decrease from one pipe unit to the next pipe unit. As the reaction fluid approaches the outlet of the reactor, gaseous reaction products are removed and reaction products in the form of liquid decrease in quantity. Thus, reaction pipe diameters are gradually rendered smaller, in other words the cross-sectional areas of reaction pipes gradually decrease toward the outlet of the reaction, in order to maintain a substantially constant in-pipe flow velocity so as to change the amount of the reaction fluid from one pipe to another pipe, thereby maintaining an effluent flow at the upper extremity of each vertical pipe.

A sixth feature of this invention is to conduct the dissolution of hydrogen gas as well as the further preheating of a paste by charging preheated hydrogen into a preheated paste. The preheating of a paste consisting of finely divided coal, a catalyst and heavy oil is carried out very fast as the preheating up to 300° C. does not cause any reaction. However, at a temperature over 300° C., the amount of hydrogen to be charged is an approximately stoichiometrically required quantity as the heating is done by utilizing the reaction heat generated from the dissolution reaction and hydrogenation reaction of the hydrogen to be charged into the preheating section. During such reactions, it is not necessary to provide gas-liquid separators as hydrogen is not excessive and only little gas and water products are formed. A few gas-liquid separators may, however, be provided. At a region of 300° - about 350° C. to 380°–410° C. in the preheating section, the gas-liquid fluid practically forms a plug flow in the vertical preheating pipes and hydrogen is charged into the pipes through the apertures formed therein. The hydrogen is charged in the form of bubbles which evenly distribute in the pipes thereby forming a completely mixed gas-liquid flow.

An embodiment according to the present invention is illustrated as follows:

<u>Preheating section [300° C.–(380–410° C.)]</u> preheated paste (below 300–350° C.) → gas-liquid ascendant pipe 1 [preheating (1)] → gas-liquid descendant pipe 2 [preheating (2)] → gas-liquid ascendant pipe 1 [preheating (3)] →

(to reaction section)

<u>Reaction Section [400° C.–500° C.]</u>

→ gas-liquid ascendant pipe 1 [1-(1)] → gas/liquid separator 5 [1-(2)]

→ gas-liquid descendant pipe 2 [1-(3)] → gas/liquid separator 5 [2-(2)]

→ gas-liquid ascendant pipe 1 [2-(1)] → . . . gas/liquid separator 5 [n-(2)]

→ gas-liquid descendant pipe 2 [n-(3)] → * (cont'd to below)

Namely, a fluid travels in the following sequence: preheating (1), preheating (2), preheating (3), preheating (4), ——— 1-(1), 1-(2), 1-(3), 2-(1), 2-(2), 2-(3), 3-(1), 3-(2), -continued

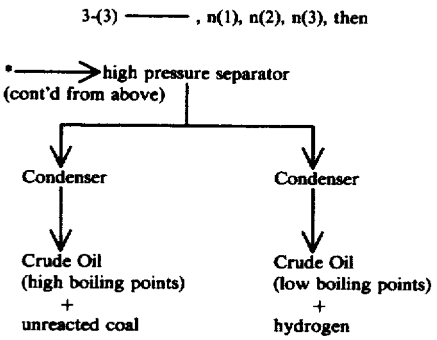

Figure 3:
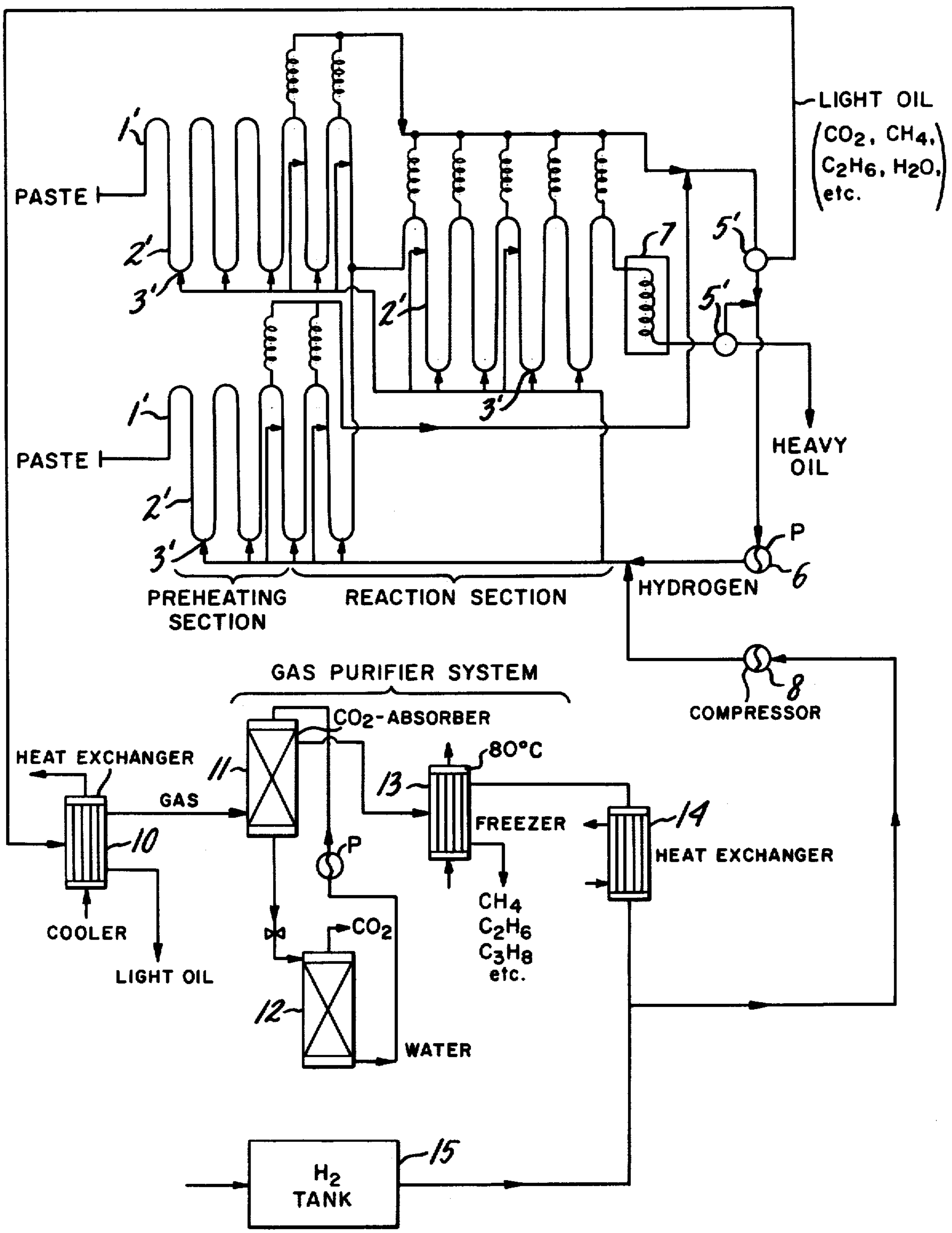
FIG. 3 is a flow diagram of another embodiment of the apparatus according to this invention.

Another modification of the present invention is as follows:

As shown in FIG. 3, in the reaction section, it is possible to reduce the number of units by combining two or more units into one unit. In the present invention, at a reaction temperature of 400° C. or higher, a portion of reaction products is gasified and the light oil fraction and water product are also converted into gaseous states. Therefore, the volume of reaction substances in the reactor decreases gradually. Accordingly, it is feasible to reduce the diameters of pipes gradually or to adapt a pipe of a large diameter by combining several pipe units from a certain intermediate point in the reactor to increase the amount of liquid.

In the present invention, hydrogen gas, which has been preheated to a reaction temperature or higher, or heavy oil (mixed oil) or a paste of a low concentration which is of relatively low temperature is charged through apertures formed in gas-liquid ascendant and descendant pipe walls at suitable locations. Within the gas-liquid ascendant and descandant pipes, a hydrocracking reaction proceeds. Gaseous products, oil products having low boiling points and excessive hydrogen gas are separated by means of a gas/liquid separator 5' via a condenser 7. The thus-separated excessive hydrogen gas is recycled by a circulator 6 to the preheating section, together with newly added fresh hydrogen gas supplied by a compressor 8. The preheated paste enters the reaction section with a preheated temperature of 380°–410° C. The reaction temperature arises due to its exothermic nature and reaches a predetermined maximum temperature. During the reaction with a view to avoiding an uncontrollable reaction, it is possible to charge heavy oil or a paste of a low concentration of a relatively low temperature to maintain the reaction under control.

Apertures 3' through which hydrogen is charged, which charging is one of the features of this invention, are formed through a gas-liquid ascendant pipe 1' and a gas-liquid descendant pipe 2' at suitable locations thereof, for example, with a distance of $3-10^m$, along the circumference thereof, in one or two rows, and in the shape of crossed slits or a square of 0.25 –0.5 cm in diameter. Two to about 50–60 apertures may be formed. The hydrogen bubbles from such apertures formed in a pipe wall are drawn into the paste in the form of small bubbles due to a turbulent flow of the paste and such small bubbles of hydrogen distributed into the paste react therewith. On the other hand, the heavy oil or paste of a relatively low concentration for controlling the reaction temperature enters the pipe through apertures formed in the pipe. Such heavy oil or paste breaks up homogeneously in the radial direction of the pipe and its main purpose of controlling the reaction temperature is thus achieved.

In the direct liquefaction of coal, $H_2$ gas is consumed in an amount of 4–8% of the coal. Apertures, adapted to charge $H_2$ gas therethrough, are preferably formed denser in the reaction section than in the preheating section, in accordance with the reaction temperature. Thus, $H_2$ gas is blown into the reaction system through the wall of the tubular reactor. $H_2$ gas may be blown into the reaction system through ascendant or descendant pipes or both. For example, apertures may be formed at 1 to 3 locations in the preheating section (not higher than 400° C.) and 3 to 8 locations in the reaction section. One or two gas-liquid separators may be provided in the preheating section while the reaction section may include 2 to 5 gas-liquid seaparators. $H_2$ gas is blown into the tubular reactor at different locations in an amount 1.5 to 3 times that to be consumed for the liquefaction of coal.

As described above, lighter gases such as gasoline having lower boiling points and excess hydrogen gas are separated by gas/liquid separators 5. As illustrated in FIG. 3, the gases and vapors from the gas/liquid separators are led to a heat exchanger 10 where they are cooled to approximately ambient temperature while maintaining their high pressure to thereby condense the light oil and separate it from the gas mixture. The thus cooled gas mixture is then washed in a $CO_2$ absorber 11 to which water is pumped from a chamber 12 to cause an absorption and removal of the $CO_2$ and $H_2O$ fractions. The resultant gas mixture is then cooled to approximately −80° C. in a heat exchanger 13 to condense $CH_4$, $C_2H_6$, $C_3H_8$, etc. and thus separate such hydrocarbons. The gas purifying system is not limited to a chill separation method, as other methods may be used. The separated hydrocarbons can be used for manufacturing hydrogen. The remaining gas is hydrogen with a purity of at least 90%. The hydrogen is heated by a heat exchanger 14 and together with fresh hydrogen from a supply tank 15 is returned to the system under pressure by compressor 8 being fed into the ascendant and descendant pipes at a plurality of locations, as described above. In the present specification, the term "coal" shall include not only brown coal and bituminous coal but also lignin powder.

The comminution degree of the raw material coal is desirably less than 100 mesh, and the coal concentration in a paste is 10 to 50% by weight, preferably 30 to 45% by weight. The catalyst may be selected from red mud iron oxides, iron hydroxides, iron sulfides, sulphur, molybdenum oxides, molybdic acid, and oxides, hydroxides, halides, cyanides and the like of tin, zinc, chromium, nickel and the like. The catalyst may be used at a concentration of 0.1 -5% by weight of coal. As heavy oil, it is possible to use heavy oil fractions of a boiling point of 300° C. or higher from hydrocracked crude oil product. The reaction temperature and pressure varies depending up the nature of raw material coal, but a temperature of 350° to 500° C. and a pressure of 120 to 700 kg/cm$^2$, which are the same as the reaction conditions for conventional direct liquefaction of coal, may be employed.

The heating of a reactor may be done by either one of combustion flue gas, electrical heatings and a molten salt.

The features of the present invention may be summarized as follows:

(1) The flow velocity within a pipe always has a Reynolds number of $3\times10^3$ or greater, and the axial dispension coefficient (D/uL) is not greater than 0.05;

(2) The reaction takes place in both ascendant and descandant pipes.

To maintain the flow velocity within the above Reynolds number and axial dispension coefficient ranges by a setting the diameter ratio of a descendant pipe to its corresponding ascendant pipe at not greater than 1 (0.5–0.85) and also by gradually reducing the diameter of the gas-liquid ascendant pipe in each pipe unit in the travelling direction of the fluid or combining near the final region of the reaction section two units or several units into one or less-numbered units respectively; and (3) By fully utilizing the features of the tubular reactor which comprises a preheating section wherein apertures are formed for charging hydrogen through pipes which are not equipped with a gas/liquid separator as well as a reaction section wherein introductory apertures for hydrogen and heavy oil or a low concentration paste are formed through pipes which are equipped with a gas/liquid separator, to obtain liquefied crude oil with a high liquid/space ratio.

The present invention will be further explained in reference to the following examples but it shall not be limited thereto.

EXAMPLE 1

In a tubular reactor comprising a preheating section which includes a repetition of a combination unit of a gas-liquid ascendant pipe and a gas-liquid descendant pipe as well as a subsequent reaction section which includes a repetition of a combination unit of a gas-liquid ascendant pipe, gas/liquid separator and gas-liquid descendant pipe, to use five 20 m/m pipes as the ascendant pipes, five 17 m/m pipes as descendant pipes in the preheating section, the length of each pipe being 10 m; in the reaction section to use in each of the first pipe unit to the fourth pipe unit a 20 m/m ascendant pipe and a 17 m/m descendant pipe, in each of the fifth and sixth pipe units a 19 m/m ascendant pipe and a 16 m/m descendant pipe, in each of the seventh and eighth pipe units an 18 m/m ascendant pipe and a 15 m/m descendant pipe, in the nineth pipe unit a 17 m/m ascendant pipe and a 14 m/m descendant pipe and in the 10th pipe unit a 16 m/m ascendant pipe and a 13 m/m descendant pipe, and each pipe length being 10 m.

A paste consisting of 40% by weight of finely divided coal of not larger than 100 mesh, 1% by weight as iron sulphides of iron hydroxides and sulphur and as heavy oil hydrocracked heavy oil obtained by removing fractions of a boiling point of 300° C. or lower from hydrocracked oil is charged at a fluid velocity of 470 kg/hr. The combined velocity of the paste and hydrogen is selected to yield a Reynolds number of $3\times10^3$ or greater and an axial dispension coefficient (D/uL) of 0.05 or lower. The preheating pipes (pressure resistant special steel pipe unit) are externally heated by gas to heat the paste to 300 atoms and 300° C. at the inlet of the preheating section and to 290 atoms and 400° C. at the outlet of the preheating section. Into each preheating pipe, hydrogen gas is fed through apertures formed in its respective pipe wall at a velocity of 15 l/hr in the standard state. A slight reaction takes place there and hydrogen is consumed at a rate of about 1.2% by weight of the coal. The paste mostly turned to a asphalten-like fluid.

In the reaction section (including pressure resistant special steel pipe unit), apertures were formed at 40 locations through the pipes. At each location 20 apertures of a 0.5 m/m diameter were formed along the respective circumference. Hydrogen gas was blown into the pipes at a flow velocity of 4 $m^3$/hr on average in the standard state at each location. More hydrogen was absorbed as the paste travelled from a lower temperature region (400° C, 290 atoms) adjacent the inlet of the reaction section to the higher temperature region (440° C., 270 atoms). More hydrogen was absorbed in the ascendant pipes than in the descendant pipes. Accordingly, at the inlet region of the reaction section, hydrogen was charged into each ascendant pipe at a flow velocity of 3.5 $m^3$/hr and into each descendant pipe at a flow velocity of 2.5 $m^3$/hr, both in the standard state. On the other hand, at the outlet region of the reaction section, hydrogen was blown into the ascendant pipes at a flow velocity of 7 $m^3$/hr and into the descendant pipes at a flow velocity of 5 $m^3$/hr. A Raynolds number of $1.1\times10^4$ and an axial dispersion coefficient of $0.5\times10^{-4}$ were observed for the fluid flow within the reaction pipes at the above reaction temperature and under the above reaction pressure. To maintain the reaction temperature within a temperature range of 430° to 440° C., in the reaction section, a paste containing coal at a concentration of 10% by weight was introduced into the reaction pipes at two locations, at each of which locations 20 apertures were formed, through the pipe walls at a flow velocity of about 10 kg/hr. The Reynolds number and axial dispersion coefficient remained unchanged.

Thus, about 182.36 kg of oil products were obtained from 188 kg (470×0.4) of coal (97% yield). The liquid/space velocity was about 10. From 470 kg/hr of the paste containing 40% by weight of coal therein, there were obtained 300 kg/hr of heavy oils containing unreacted solid portions, 196 kg/hr of heavy and light oils, 14.4 $m^3$/hr of gaseous products and 18 l/hr of water product.

Subsequent to the removal of the unreacted solid portions by virtue of centrifugal separation, the heavy oil was again used as heavy oil (mixed oil) for preparation of a paste.

EXAMPLE 2

A tubular reactor, which comprises a preheating section (I) including a repetition of a combined unit of a gas-liquid ascendant pipe and a gas-liquid descendant pipe and a reaction section (II) including a repetition of a combined unit of a gas-liquid ascendant pipe, gas liquid separator and a gas-liquid descendant pipe, and another tubular reactor which comprises a preheating section (I') and a reaction section (II'), were combined together and then another reaction section (III) was joined to carry out a reaction. In the preheating sections (I, I'), each ascendant and descendant pipes had diameters of 20 m/m and 17 m/m respectively, and was 10 m long. Five of such ascendant pipes were employed and the same number of such descendant pipes were also used (10 m×10 pipes). In the reaction sections (II, II'), eight 20 m/m to 17 m/m ascendant pipes and eight 17 m/m to 14 m/m descendant pipes were used. The pipe diameters gradually decreased among the same types of pipes. Each pipe was 10 m long (10 m×16 pipes). In the reaction section (III), two 21 to 17 m/m ascendant pipes and two 18 to 14 m/m descendant pipes were used. Between the same types of pipes, the first pipes were thicker than their respective second ones. Each pipe was 10 m long (10 m×4 pipes). The outlet of the reaction section (III) was connected to a high pressure separator and a condenser.

A paste of 40 weight % coal concentration was charged into each of the preheating sections (I, I') at a flow velocity of 452 kg/hr. In each of the preheating sections (I,I'), the paste was preheated to 360° C. to 400° C. with a residence time of 3 minutes. In the reaction sections (II, II'), the thus-preheated paste was carefully reacted to reach a temperature of 400° C. to 430° C. and in the reaction section (III) the reaction was carried out by introducing a slight quantity of heavy oil through apertures formed in the pipe walls to control the reaction temperature so as to reach a temperature of 430° to 460° C. Hydrogen gas was blown into the preheating sections (I, I') through apertures formed in the pipe walls at 10 locations. At each location, there were 20 apertures. The total quantity of the charged hydrogen was 20 $m^3$/hr in the standard state. In other words, hydrogen was charged at a flow velocity of 2 $m^3$/hr at each location. In the reaction sections (II, II'), hydrogen was fed at 36 locations at a flow velocity of 6 $m^3$/hr on average per location. In the reaction section (III), hydrogen was charged at 8 locations at a flow velocity of 6.4 $m^3$/hr on average per location.

The flow velocity of the fluid flow in the preheating and reaction sections (the combined velocity of hydrogen and the paste) was $1.2\times10^4$ in terms of Reynolds number at the above temperatures and under the above pressures. With 452 kg/hr of the paste flow velocity, there were obtained 37 kg/hr of water, 36 $m^3$/hr of gas, 244 kg/hr of light weight oils including gasoline and 543 kg/hr of heavy oils. The liquid/space ratio was about 10.

What we claim is:

1. A process for directly liquefying coal in a reactor comprising a preheating section and a reaction section connected with said preheating section, each of said sections comprising a plurality of pressure resistant ascending and descending vertical reaction pipes connected in series with one another, which process comprises:

charging paste consisting of finely divided coal, catalyst and heavy oil into said preheating section and passing it sequentially through said series-connected vertical pipes of said preheating section while heating said paste in said preheating section to a temperature of between 380° C. and 410° C. and simultaneously feeding preheated hydrogen gas into each of said pipes of said preheating section to create a combined velocity of the paste and hydrogen gas within the preheating section of Reynolds number of at least $3\times10^3$ and an axial dispersion coefficient (D/uL) of not more than 0.05;

forwarding the thus-preheated paste and hydrogen gas into said reaction section and passing them sequentially through said series-connected vertical pipes of said reaction section while heating the thus-forwarded paste and hydrogen gas to a temperature of 400° to 500° C. at a pressure of 120 to 700 Kg/$cm^2$, employing high pressure gas-liquid separators to remove excess hydrogen gas and gaseous products such as methane, ethane, gasoline and lighter oils at upper ends of ascending pipes of said reaction section, and feeding into each of said pipes of the reaction section preheated hydrogen gas under pressure to maintain the partial pressure of hydrogen gas high and to create a combined velocity of the paste and hydrogen gas within the reaction section of a Reynolds number of at least $3\times10^3$ and an axial dispersion coefficient (D/uL) of not more than 0.05, the total quantity of hydrogen gas fed in said preheating section and reaction section being one to three times the stoichiometrically required amount thereof, the reaction of hydrogen gas with said paste taking place in both ascending pipes and descending pipes of said reaction section to produce liquefied crude oil with a liquid/space ratio of 4 to 20.

2. The process according to claim 1, wherein a preheated paste of a low concentration or preheated heavy oil is additionally fed into the reaction section together with the preheated first hydrogen gas.

3. The process according to claim 1, wherein a paste of a low concentration or heavy oil which has not been preheated is additionally fed into the reaction section to adjust the reaction temperature.

4. The process according to claim 1, wherein said high pressure gas-liquid separators are connected in series between successive pipes of said reaction section to remove said excess hydrogen gas and gaseous products.

5. The process according to claim 1, wherein said excess hydrogen gas removed with said gaseous products is recycled and reintroduced with additional hydrogen gas into said preheating section.

6. The process according to claim 1, wherein hydrogen gas is introduced at at least two locations in each of said pipes of said preheating section.

7. The process according to claim 1, wherein hydrogen gas is introduced at at least two locations in each of said pipes of said reaction section.

8. The process according to claim 6 or 7, wherein the hydrogen gas is fed into said pipes in a radial direction.

9. A process according to claim 1, in which excess hydrogen gas and gaseous products are also removed from said reaction section by high pressure gas-liquid separators at lower ends of descending pipes of said reaction section.

10. A process according to claim 1, in which in said reaction section the void ratio of hydrogen bubbles is maintained at approximately 10% to 30% in both ascendent pipes and descendent pipes.

11. A process according to claim 1, in which the concentration of hydrogen gas is maintained substantially constant throughout the reaction system.

12. A process according to claim 1, in which excess hydrogen is removed by said high pressure gas-liquid separators with said gaseous products, and in which the gaseous products and hydrogen thus removed are processed to separate the hydrogen from said gaseous products, whereupon the hydrogen is fed together with fresh hydrogen to said preheating section.

* * * * *